United States Patent [19]

Beckschulte et al.

[11] 4,370,945
[45] Feb. 1, 1983

[54] METHOD FOR GLUING OF PARTICLES CONTAINING CHIPS, FIBERS AND SIMILAR LIGNO-CELLULOSE-CONTAINING PARTICLES AND APPARATUS FOR THIS PURPOSE OF GLUING THE SAME

[75] Inventors: Heinrich Beckschulte, Salzkotten-Scharmede; Wilhelm Schlüter, Altenbeken-Schwaney, both of Fed. Rep. of Germany

[73] Assignee: Gebrüder Lödige Maschinenbau Gesellschaft mit beschränkter Haftung, Paderborn, Fed. Rep. of Germany

[21] Appl. No.: 256,816

[22] Filed: Apr. 23, 1981

[30] Foreign Application Priority Data

Apr. 25, 1980 [DE] Fed. Rep. of Germany ....... 3016061

[51] Int. Cl.³ ............................................. G01D 13/22
[52] U.S. Cl. .................................... 118/303; 427/212; 366/147; 366/329
[58] Field of Search ................ 366/147, 329; 118/303; 427/212

[56] References Cited

U.S. PATENT DOCUMENTS 3,198,655  8/1965  Gisiger .............................. 118/303
4,006,887  2/1977  Engels .............................. 118/303

FOREIGN PATENT DOCUMENTS

595179  2/1978  U.S.S.R. ............................ 118/303

Primary Examiner—Sam Silverberg
Attorney, Agent, or Firm—Becker & Becker, Inc.

[57] ABSTRACT

A method for gluing of chips, fibers, and similar ligno-cellular containing particles which are discharged falling free in a vertical chute and being subjected at least partially to rotational forces during the downward movement thereof, being glued and thereafter being discharged from the chute, characterized thereby that the chips during the free fall thereof are collected into a rotating chip material ring and after at least substantial formation of the chip material ring being glued and that directly subsequently chips of the at least substantially formed chip material ring are subjected to components of movement directed upwardly in such a manner that the chip material ring is stopped in the downward movement thereof. A gluing machine for carrying out the foregoing method includes at least one substantially vertical chute with a circular-shaped cross section, an upper chip inlet and a chip outlet or discharge located therebelow as well as having pipes or tubes and also pump means for supplying glue and having rotating tools influencing the movement of the chips, characterized thereby that the drum-shaped chute has a shaft rotating at high speed passing therethrough upon which chip ring forming tools are arranged above in the region of the incoming chips and therebelow brake tools are arranged stopping the downward movement of the chips and that the chip inlet provides a directional component parallel to the rotational axis of the shaft and the chip outlet is arranged at the lower end of the chute.

24 Claims, 16 Drawing Figures

METHOD FOR GLUING OF PARTICLES CONTAINING CHIPS, FIBERS AND SIMILAR LIGNO-CELLULOSE-CONTAINING PARTICLES AND APPARATUS FOR THIS PURPOSE OF GLUING THE SAME

The present invention relates to a method for gluing of chips, fibers and the like including ligno-cellulose-containing particles, which are released free-falling in a vertical shaft or duct and during the downward movement therein being subjected at least partially to rotational forces, being glued and thereafter being delivered from the shaft, duct or chute; the present invention also relates to an apparatus for carrying out the foregoing method with an at least substantially vertical shaft or chute having a circular shaped cross section, an upper chip inlet and a chip outlet located therebelow, means for supplying or feeding glue and including rotating tools which influence the movement of the chips.

BACKGROUND OF THE INVENTION

With a known method of this type disclosed by German Offenlegungsschrift No. 16 53 264 for gluing and impregnating of wood chips and the like, the chips by way of conveyor belts come free-falling into a conical funnel which opens into a mixing container that is larger in diameter than that of the funnel. The chips fall into the mixing container without mechanical engagement with rotating parts until reaching a mixing tool located at the container bottom; the mixing tool is provided for example in the shape of a centrifugal disc or plate and the chips along this path pass through a downwardly directed spray cone generated in the middle of the container. The centrifugal disc or plate, supported by particularly embodied blades, scoops and the like move the chip flow which has fallen through the glue-spray-cone along the walls of the cylinder in a flow upwardly again circulating around the middle downward flow of the chips, whereby chips not yet coated or covered with glue prior to entry thereof into an upwardly located tangential discharge or outlet can come again with the central incident or oncoming chip cone or funnel downwardly in the region of the central downwardly directed glue-spray-cone.

Disadvantageous with this known approach is that the vertical mixing container must have such a large diameter that the glued chips passing from the bottom of the mixing container helically or spirally to the upper outlet do not influence the chip funnel dropping downwardly within this external flow. Furthermore, there exists the disadvantage that the chips are destroyed during reversal thereof by 180°, particularly upon impinging against the fast rotating centrifugal plate or disc and the conveying tools thereof. With the known machine accordingly chip destruction arises as such destruction had to be encountered and accepted with the known and previously horizontally located fast rotating gluing machines with which the chip material must be reversed or diverted from the vertical into a horizontal direction by entry, feeding or drawing-taking-in blades. The mixing tools, particularly the diverting or reversing blades located in the diverting or reversing location of the chip flow heat up relatively strongly as a consequence of the friction and braking of the chips encountered therewith. The consequence is a rapid wear of these diverting or reversing tools as well as a rapid wearing-off of the drum in the region of the diverting or reversing zone.

The main disadvantage lies in the chip destruction itself aside from the wear which is not inconsiderable or unimportant. The chip destruction has as a consequence a reduction of the transverse and bending strength (ultimate tensile strength or tenacity) for the finished chip panel or plate as well as a considerably greater glue consumption, since the glue consumption is greater to an extent commensurate with the smaller the glue particles are respectively therewith.

An object of the present invention accordingly is to create a gluing method or gluing machine with which the incoming chips without positive reversal or diverting thereof out of the incoming direction are subjected to an optimum gluing and glue distribution in a direction vertical or opposite thereto without shock, impact or surge stress, and with a minimum heating by friction. A gluing machine suitable for carrying out this method is to assure a high chip capacity or through-passage with smallest possible chip destruction during an economical gluing with nominal space requirement.

SUMMARY OF THE INVENTION

The method of the present invention includes steps of collecting the chips into a rotating chip material ring during the free fall thereof, and applying glue after the at least substantial formation of the chip material ring and directly subsequently subjecting chips of the at least substantially formed chip material ring to upwardly directed components of movement in such a manner that there is stopping of the chip material ring in the downward movement thereof.

The gluing machine or apparatus includes a drum-shaped chute having a rotating shaft passing therethrough with high speed upon chip-ring forming tools are arranged above in the region of the incoming chips and therebelow brake tools are arranged stopping the downward movement of the chips and that the chip inlet provides directional components parallel to the rotational axis of the shaft and the chip outlet is arranged at the lower end of the chute.

Chips or similar ligno-cellular-containing particles can be glued or have glue applied thereto with the least possible method and machine cost with the present invention without as previously with rapidly running continuously operating gluing machines there must be accepted any important or noteworthy destruction of the chip structure and the qualitative disadvantages of the finished chip panel or plate brought about conditionally thereby (reduction of transverse and bending strength or tenacity) ultimate tensile strength. As a consequence thereof that the structure of the chips no longer is destroyed due to lack of strong mechanical diverting or reversing forces effective upon the free-falling chips, a considerable reduction of quantity of glue necessary for the gluing or application of glue can be effected or brought about. The extraordinary protection of the chip structure even makes possible that the inventive method and machine of the present invention aside from gluing or application of conventionally thick and medium-layer chips also can be utilized for gluing or application of glue of large-surface wood chips, so-called strands and wafers, accordingly chips having a length of approximately 50 to 80 mm, a width between 4 to 10 mm, and a thickness between 0.3 to 0.6 mm (so-called strands) and applicable for substantially quadratic chips with a surface of 30×30 to 70×70 mm and a thickness of 0.4 to 0.8 mm (wafers). A further essential advantage is a considerable reduction of the glue accumulation along the inner wall of the chute, the tools and the shaft; consequently, the ring formation can be so controlled or regulated that the chip material ring has a sufficient intensity immediately to wipe away the glue accumulating on the wall.

This object, and other objects and advantages of the present invention will appear more clearly from the following specification in connection with the accompanying drawings, in which:

FIG. 10a is a section taken along line Xa—Xa in FIG. 10;

DETAILED DESCRIPTION

Figure 1:
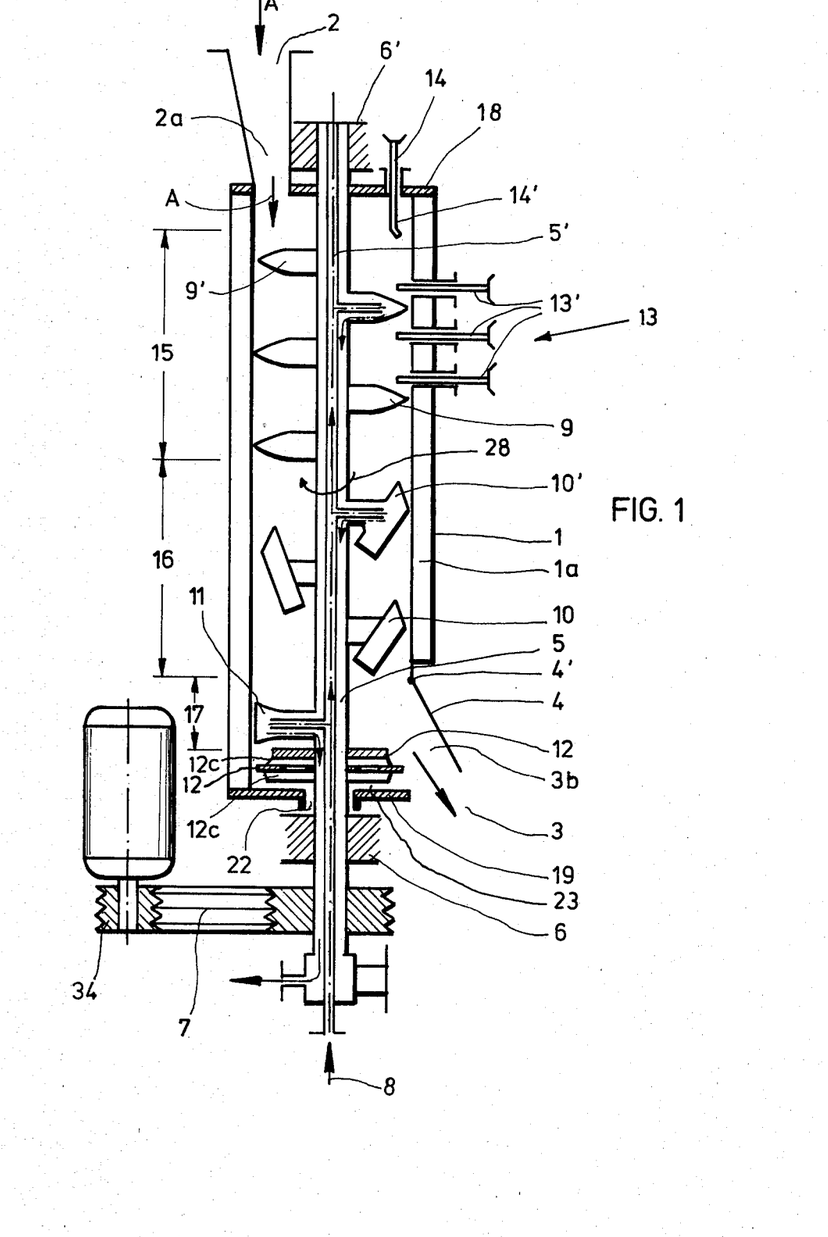
FIG. 1 is an axial section through a gluing machine illustrated schematically.
Figure 10:
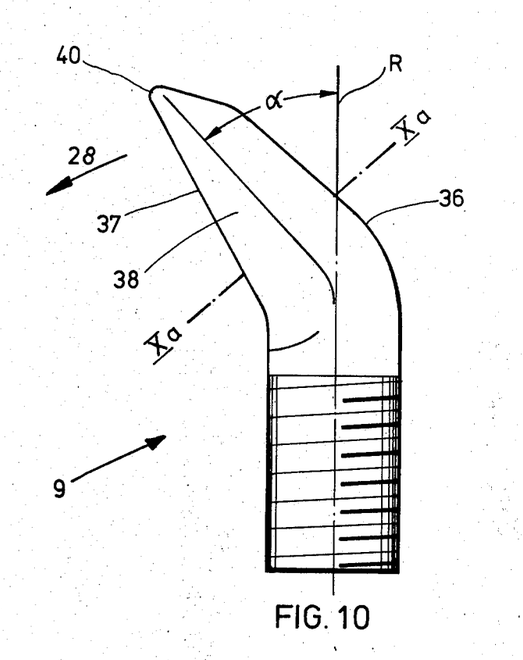
FIG. 10 is a view of a chip-ring forming tool.

Referring now to the drawings in detail, the inventive gluing machine provides a drum-shaped chute 1 with circular-shaped cross section which has a double mantle 1a with cooling water flowing therethrough. The chute is preferably arranged exactly perpendicular or vertical and has an upper chip inlet 2 as well as a lower chip outlet 3. A tool shaft 5 with a rotational axis 5' rotated by drive means 7 in a direction of arrow 28 is located centrally in the chute 1. The drive means 7 comprises a motor 34 with a drive or transmission means, including for example a V-belt drive. The shaft 5 is journalled below externally of the machine in a thrust bearing 6 and is journalled above in a bearing 6'. Chip-ring-forming tools 9 as illustrated for example more closely in FIGS. 10, 10a are located in the upper region of the shaft 5 below the inlet 2. These tools 9 rotate with the shaft 5 with very high speed and bring about that the freely incoming or dropping chip material is collected into a chip ring as entering in the direction of the arrow A from the inlet 2 into the cylindrical chute without any reversal or diverting; the chip ring forms in the ring-forming zone 15 under the influence of the high rotational speed of the shaft including the tools 9. As a consequence of the high centrifugal forces, the mass of the chips accumulates or deposits on the inner wall of the chute and moves downwardly in a spiral or helical manner. Under these circumstances, the chip flow moving downwardly along the walls comes into a region of glue or adhesive addition 13 which in the sample embodiment comprises three axially extending outer or external gluing pipes or tubes 13' arranged adjacent to each other. The external gluing tubes 13' are arranged closely adjacent to the ring-forming tool means 9 so that these pass directly therebetween. Liquid glue or another fluid necessary for the gluing or application of glue discharges from the openings of the glue tubes 13' projecting equally or at different distances into the free cylinder chamber discharging directly into the chip mass and being received thereby and distributed. Since the chips are glued in a chip ring gliding along the wall, the glue distributed from these tubes 13' at the discharge is distributed intensively and uniformly upon the chips as a consequence of the intimate or homogeneously mixed whirling through and mixing through thereof which means by way of the chip-to-chip friction or rubbing.

Tools 10 located below the horn-like embodiment of tools 9 also serve for this intensive thorough mixing and uniform distribution of the glue inside the chip ring. These tools 10 are equipped in such a manner that they exert a stopping or braking effect upon the chip mass slipping downwardly in the form of a more or less compact chip ring so that a dwell of the chip mass is effected sufficient for the glue distribution in the ring-forming zone 15 and the adjoining stabilizing- or braking-zone 16. For this purpose, the tools 10 stopping the chips or braking the chip mass are provided offset or displaced as to each other along an axial distance which is approximately as large as the ring-forming zone 15.

Figure 11:
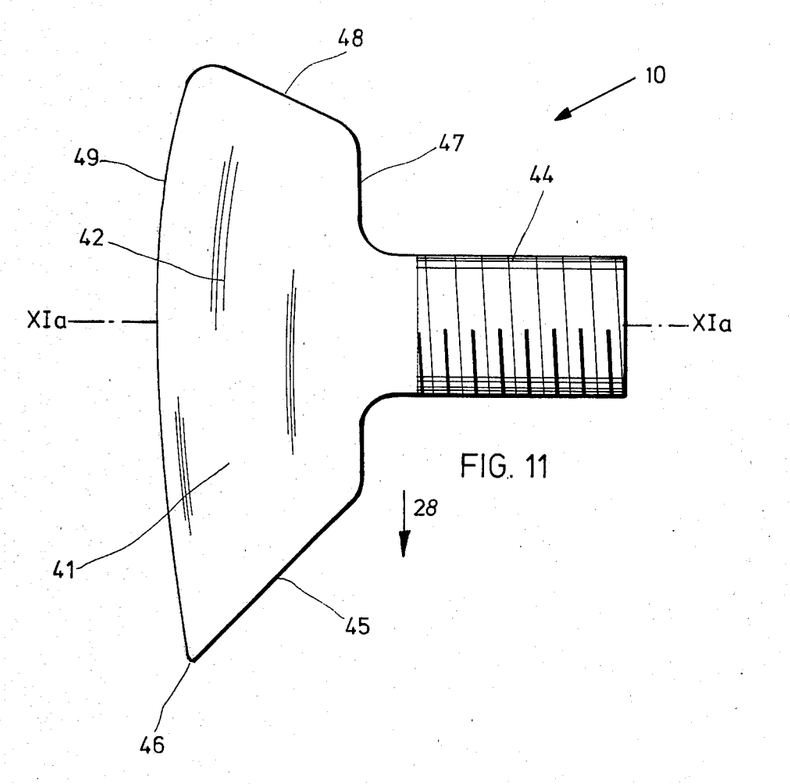
FIG. 11 is a view upon a brake tool.
Figure 11A:
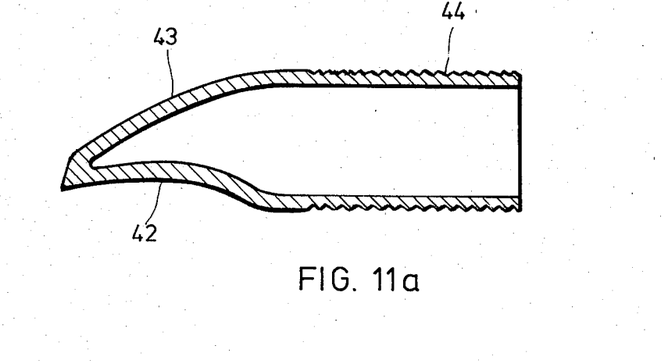
FIG. 11a is a section taken along line XIa—XIa of FIG. 11.

With an advantageous embodiment, these tools 10 have a shape as illustrated in FIGS. 11, 11a. Moreover, the braking tools 10 are located behind the glue addition or adding means 13 in arrow direction of the chips as represented by a reference A without by way of this preferred arrangement there being precluded any such arrangement with which braking tools 10 suitably in combination with chip-ring-forming tools 9 can be arranged in the ring-forming zone or gluing zone 15.

A discharge or ejection zone 17 provided with ejection tools 11 adjoins the braking zone 16. The ejection tools 11 advantageously have a paddle-shaped form as shown for example in FIGS. 12, 12a.

The flow of glued chips or chips having glue applied thereto moving essentially in vertical direction downwardly discharges by way of the outlet 3 which is embodied as a penetration or opening in the double mantle 1a in FIG. 1 and which is provided with a discharge door or flap 4.

This discharge door is journalled or suspended swinging or pendulating at 4'; the discharge door suitably can be provided with a counterweight. The discharge door also can be embodied as an elastic closure, for example as a multiply slotted rubber flap embodied in a simple or straightforward manner. The flap, however, can also be loaded or biased by a conventional spring tension.

The tool shaft as well as all tools 9, 10, 11 arranged thereon are made hollow and are cooled by a cooling water flow passed or guided therethrough. The drum-shaped chute 1 is divided in axial direction with the sample embodiment according to FIG. 1 and is made capable of being opened on hinges or folded out for the purpose of easily assembling for cleaning and repair purposes. The vertical arrangement saves need for providing a special counterweight.

The chips to be glued or have glue applied thereto or other ligno-cellulose-containing particles accordingly come free falling in the direction of arrow A into the chute by way of an inlet 2 located above the chute 1. The chips or particles are collected into a chip ring directly after entry into the chute without any reversal or diverting by way of protectively operating horn tools and the chips or particles are wetted with a fluid or liquid glue whereby the chips or particles are stopped or braked in the downward movement thereof, particularly by force components directed upwardly in the chute effective below the chip-ring-forming zone. The chips or particles can be moved upwardly again counter to the downward direction during every passage of the so-called brake tools 10. The upwardly directed components of movement effected upon the chip mass are applied to the chips in spaced intervals during every rotation of the tools 10 whereby a delay enhancing the chip formation and a dwell of the chip flow sufficient for the glue distribution are attained. The intensive mixing of the chips necessary for optimum glue distribution can be adjusted or set at an optimum by a corresponding determination or proportioning of the size of magnitude of the movement and force components effective upwardly upon the chips in such a manner that for example in the region of the zones 15 and 16 the downward movement of the chip ring is overlapped in an upward movement of the chip flow. As a consequence of the formation or development of an opposite movement for the chip flow and by way of the special formation or development of the brake tools 10 created for this purpose, there is attained an intensive mixing of the chips simultaneously aside from the necessary stabilization and the necessary dwell time such that the chip material additionally cleans the inner walls of the chute and especially during overlapping of the downward movements and upward movements the chips are turned and intensively glued therewith on all sides.

The paddle tools 11 located below the tools 10 (brake tools) stopping the chip ring feed the glued chip material toward the outlet 3.

Figure 2:
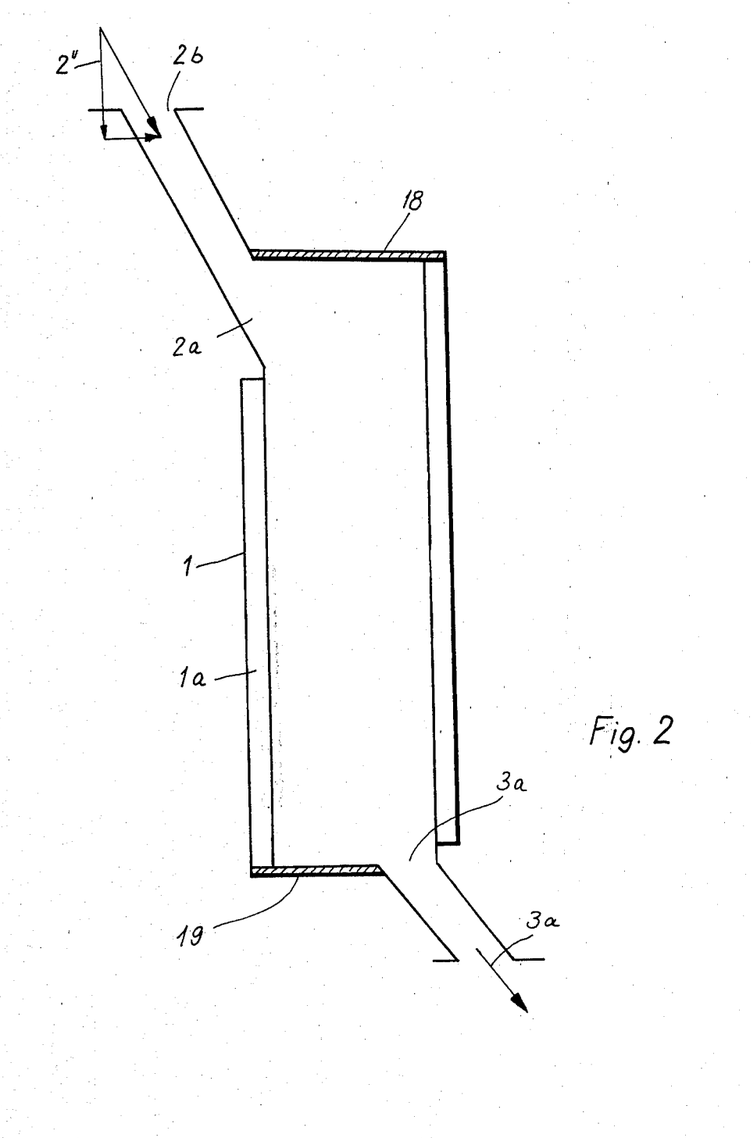
FIG. 2 shows the same axial section through the drum-shaped chute of the gluing machine without centrifuging-tool shaft with tools and drive.

With the embodiment of FIG. 1, the inlet 2 is arranged above the upper face side 18 of the chute 1 and the opening passes through the face side 18. As shown by the sample embodiment of FIG. 2, the inlet chute 2b also can be arranged laterally in the upper segment of the chute 1, whereby the opening 2c thereof passes laterally through the double mantle 1a of the chute 1. FIG. 2 illustrates a further possibility with which the outlet 3a is provided with the opening 3c thereof within the lower face side 19 of the chute 1.

With the embodiment of FIG. 1, the inlet 2 is located in the one half of the chute 1 while the outlet 3 can be provided in the other half capable of being moved away from the first half.

Figure 3:
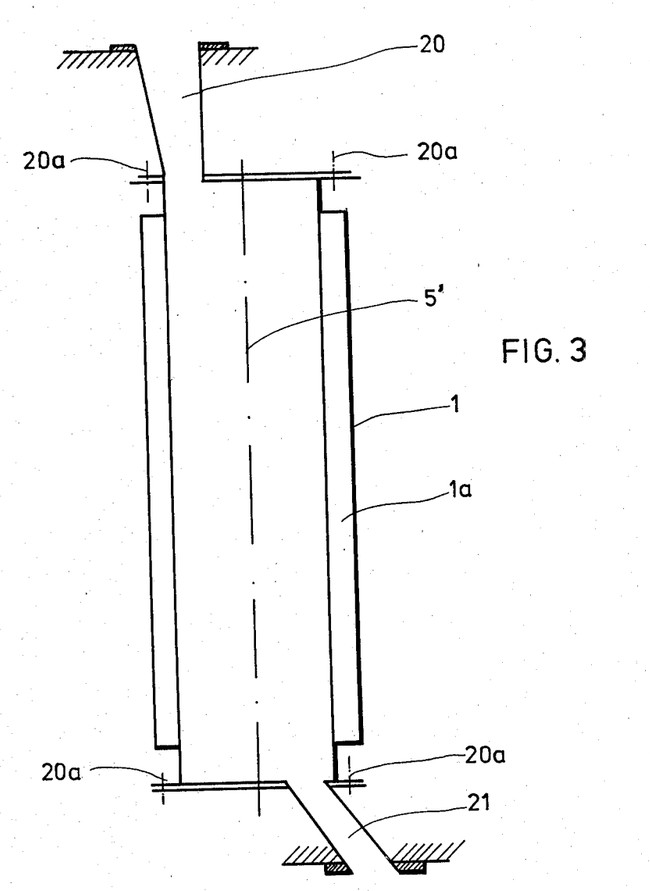
FIG. 3 shows an axial section of a further embodiment corresponding to the illustration of FIG. 2.

With the embodiment of FIG. 3, which shows the chute 1 without tool shaft and tools, the inlet 20 and the lower outlet 21 are advantageously installed rigidly or fixed in location and releaseably connected with the chute 1, preferably by way of a quick releaseable connection in such a manner that the chute as an entirety even if itself made in two parts can be quickly removed as a unit and for instance when the drum-type chute 1 is dirty or contaminated, quickly being capable of being exchanged for another chute. The screw connection or a releaseable quick coupling provided therewith is schematically illustrated in FIG. 3 and is designated with a reference 20a.

Figure 4:
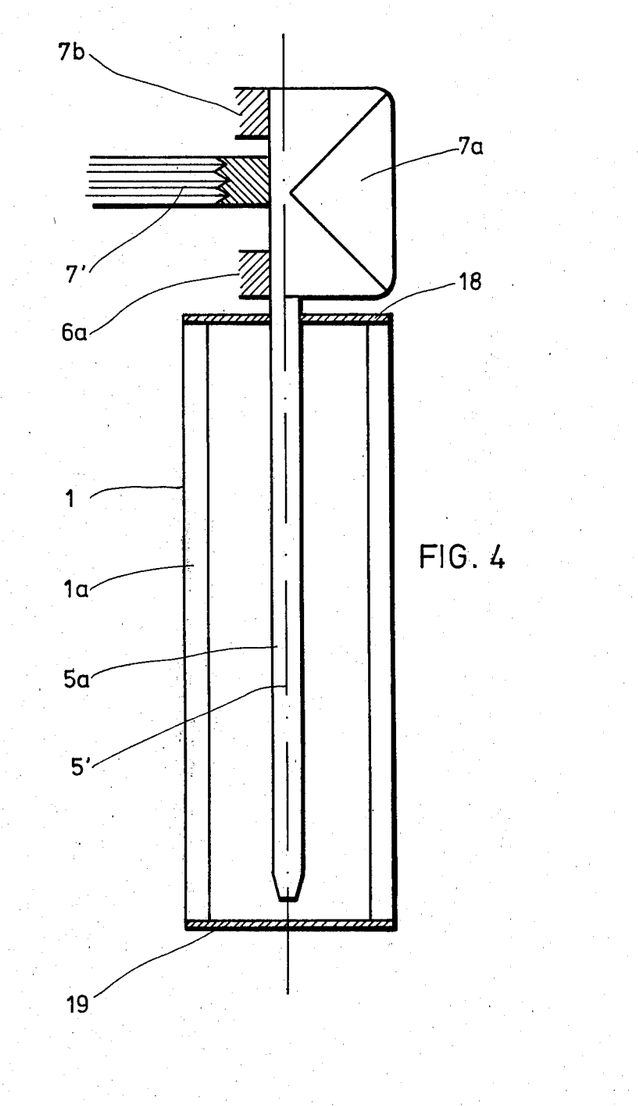
FIG. 4 shows a further axial section through the chute of the machine with a tool shaft journalled on one side with drive from above.

In place of a journalling of the centrifuging tool shaft 5 as shown in FIG. 1 by way of an upper bearing 6' and a lower thrust bearing 6, there can also inventively be provided a floating or single-sided journalling of the shaft 5 in that the shaft 5a as illustrated in FIG. 4 is journalled only by means of a double-sided or bilateral, upper bearing 6a, 7b. The drive can occur by way of a V-belt drive 7' or by way of a drive motor 7a which is arranged above the chute 1. With the drive motor 7a there is eliminated the bilateral upper journalling.

For the purpose of attaining a steady, smooth, shockless or jolt-free delivery of the glued chips protected as far as possible, according to a further feature of the invention a discharge device in the form of at least one rotating centrifuging disc or plate 12 is provided above the lower face side 19 of the chute 1. This rotating centrifuge disc or plate 12 can be driven separately; the centrifuge disc or plate 12 however also can be rigidly connected with the shaft 5 (see FIG. 5).

The centrifuging disc or plate with the embodiment of FIG. 1 is located directly above the lower surface 19, accordingly directly above the bottom of the chute 1, and having spacing relative thereto whereby air inlet openings are provided in the bottom 19 in such a manner that the centrifuging disc or plate 12 serves for formation of an air flow or air cushion shutting or diverting away chips. For the purpose of increasing the air conveying effect of the rotating centrifuging disc 12, this disc 12 preferably along the underside thereof or along the edge thereof can be provided with ribs or similar air-conveying means 12c. The air is suctioned through the suction-air-inlet openings 22 preferably slot-shaped as provided below the centrifuging disc 12 coaxially relative to the shaft 5, and conveyed between the underside of the centrifuging disc 12 and the lower surface 19 of the chute 1 in a direction toward the outlet and consequently aiding in discharge protecting the chip flow without having the glued chips strike or engage upon the centrifuging disc 12, and consequently being subjected to a danger of chip destruction. The air-conveying and guidance of the centrifuging disc can be so developed that the conveyed air rises in the lower part of the chute by a predetermined extent or measure upwardly along the inner wall of the chute and accordingly permitting an air cushion to arise which makes possible a protective chip movement.

Figure 5:
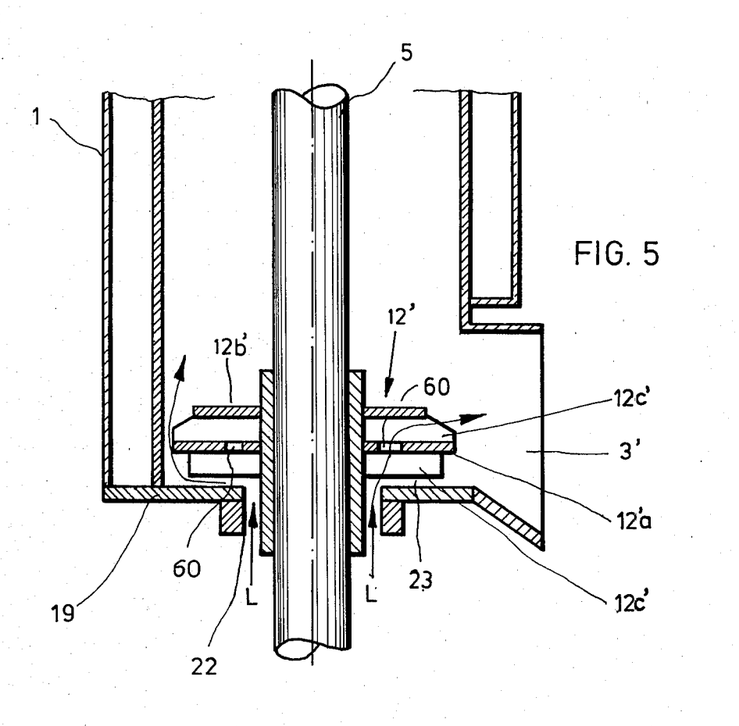
FIG. 5 shows a partial section through the lower segment of the drum-shaped chute with an advantageous arrangement of a centrifuging disc or plate.

With the embodiment of the centrifuging disc 12' according to FIG. 5, the disc is located securely or rigidly upon the shaft 5 above a suction opening 22' in the lower surface 19 of the chute 1. Air feeding or conveying ribs 12'c as well as at least one centrifuging disc 12' reaching nearly to the wall of the chute 1 effect a suctioning of air in the direction of the arrows L whereby advantageously above the first disc 12'a there is arranged a second disc 12'b which likewise is provided with air-conveying ribs 12'c and the like. Also here the suctioned and upwardly conveyed air is to support the chip cushion and preclude that the dropping chips come into engagement with the centrifuging disc. For improvement of the air guidance, it is noted that the discs 12a and/or 12b can be provided with air openings 60, ribs and the like.

With the embodiment of FIG. 1, a glue addition or supply means 13 is provided from the outside with which the glue addition tubes or pipes 13' arranged individually axially with spacing from each other pass through the double mantle 1a and terminate inside the mantle. The glue supply or additive means 14 is provided as an alternate glue additive or supply means in the region of the upper face side 18. Also several supply or additive pipes or tubes 14' can be provided whereby the tube 14' passes through the face side 18 and opens approximately in the region of the uppermost chip-forming tool 9' in such a manner that the discharge opening preferably is directed against the wall of the drum or chute 1.

Figure 6:
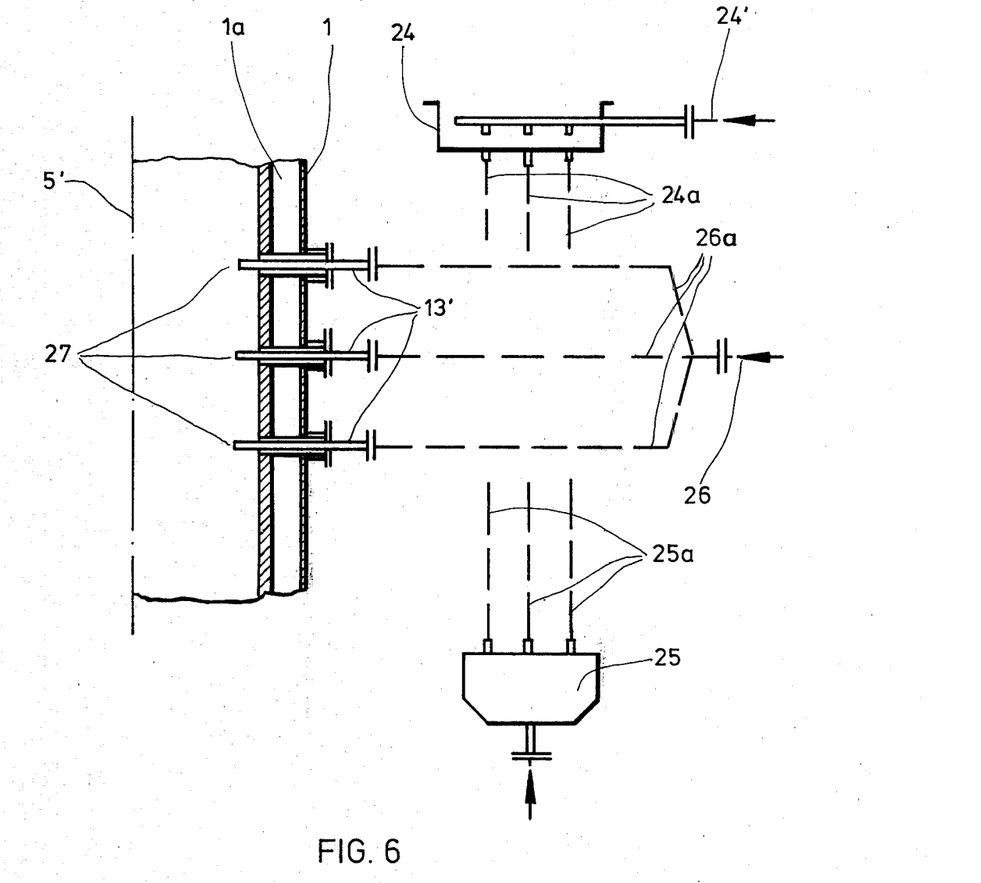
FIG. 6 shows differing sample embodiments for supply or feeding of glue.

FIG. 6 schematically illustrates different possibilities of glue feeding or supply from the outside. The glue supply pipes basically can be arranged distributed along the circumference or periphery of the chute 1 in an axial and/or radial plane but also in a helical or spiral shape.

With axial arrangement as shown in FIG. 1, it is purposeful if the chip-forming tools 9 each pass directly between two adjoining glue supply tubes or pipes 13' and flowing along the same in such a manner that the inwardly projecting segments of the tubes or pipes 13' are engaged by the chip flow taken along or following therewith so that approximately glue adhering to the glue pipes or tubes is wiped away continuously.

In FIG. 4, there is shown a glue container 24 connected by way of conduits 24a with the glue supply pipes or tubes 13 corresponding to the axial arrangement of FIG. 1; this glue container 24 is embodied pressureless and is effective as a glue distributor and is supplied by a glue feed or supply conduit 24'.

Also conceivable is an embodiment with which a glue distributor 25 (see FIG. 6) lies below the glue supply pipe or tube 13' and is connected with feed lines or conduits 25a to the glue pipes or tubelets 13'. The liquid glue is supplied to the distributor 25 through the collecting conduit 25'.

The pipes or tubes 13' also can be arranged distributed over the periphery or circumference of the chute 1 in a radial plane and can serve also for supplying or admixing of additional components such as emulsions, water, insecticides and the like, irrespective of whether an axial or radial arrangement is used. With the arrangement of a glue container below the feed or supply pipe 13', the glue supply or addition occurs by means of nominal overpressure.

FIG. 6 illustrates yet another embodiment with which the distributor is a hose conduit 26 which lies in the height or level of the glue supply pipe 13' and leading from the conduits 26a to the individual pipes 13' whereby between 26 and supply lines 26a there is connected a distributor piece. This embodiment is especially suitable when the glue is added under pressure.

As shown further by FIG. 6, the conduits of these individual arrangement possibilities lead to the pipes or tubes 13' which also with this embodiment project over the wall of the chute 1 into the free cylinder space of chamber. The glue supply tubes can with an especially advantageous embodiment be provided with high pressure nozzles preferably wide-stream nozzles and also being provided with a high pressure pump with which preferably a pressure of 20 to 40 bar is generated and being connected therewith. The glue is distributed into a wide spray or stream by such nozzles whereby an especially intensive and good glue comminution and glue distribution is attainable.

Figure 7:
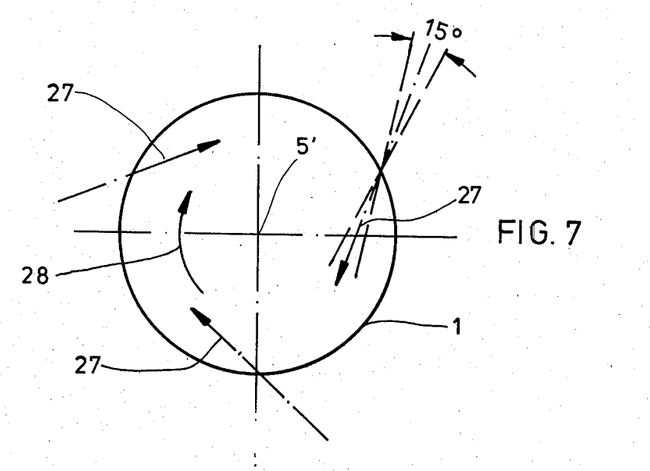
FIG. 7 shows a schematic radial section with a schematic illustration of the arrangement of glue tubes and nozzles.

FIG. 7 shows that such nozzles can be arranged lying in a single radial plane whereby advantageously three nozzles are distributed uniformly over the periphery or circumference. The nozzles also can be located adjacent to each other in axial direction so that also the tools 9 can graze therealong and therebetween.

Figure 7A:
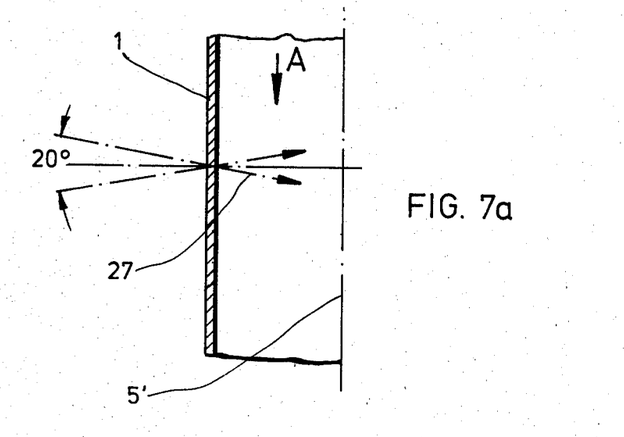
FIG. 7a shows a radial section corresponding to that of FIG. 7.

The glue supply nozzles 27 are shown in FIG. 7; these glue supply nozzles 27 are preferably arranged tangentially in such a manner that the nozzles 27 open into the chute 1 in the rotational direction 28 of the chip ring. The nozzles 27 can further be pivotally journalled in such a manner that the spray stream is pivotable toward all sides within the pivot region of 10° to 90°, preferably 15°. Upon adjustment or setting of the nozzles up to 90° there is possible a glue addition or supplying counter to the rotational direction of the chip material ring whereby an improved whirling of the chip veil or mist is brought about. By way of the tangentially directed discharge of the spray stream existing under high pressure, there can be enhanced the ring formation of the chip flow in the region of the ring formation zone 15. Furthermore, there is to be attained by way of the adjustment of the nozzles 27 in all directions and on all sides that the spray cones of different sizes are generated whereby the deposit formation of accumulation of glue on the inner wall of the drum chute, on the tools and on the shaft is precluded. Finally, by way of the upward or downward inclination of the spray nozzles 27 as schematically illustrated in FIG. 7a, there also can be influenced the formation and shape of the chip ring or the downward- and/or upward-movement thereof, and accordingly there can be influenced the duration of dwell time therewith.

Accordingly, by way of the lateral or height pivot capability of the nozzles, particularly the nozzle stream, there can be influenced the speed of the downward movement of the chip flow, particularly to such an extent that with a spray direction counter to the arrow direction A the desired intensive glue distribution is increased and by way of the side adjustment and/or different sizes of spray cones, the glue deposit or accumulation on the drum wall and shaft 5 is precluded.

Figure 8:
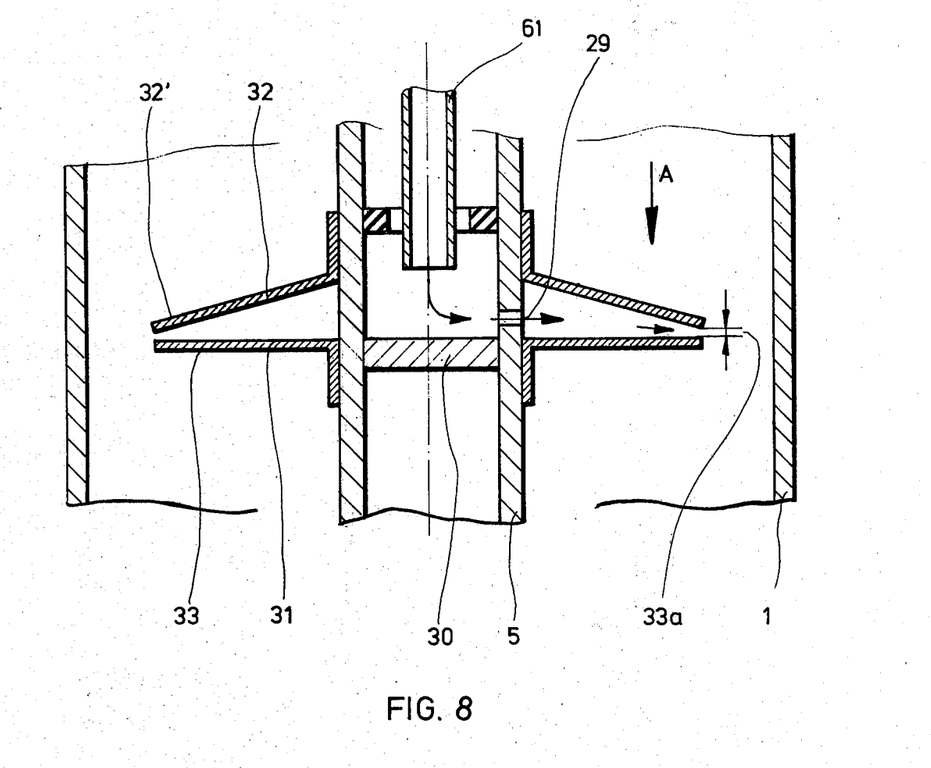
FIG. 8 shows an axial partial section through the drum-shaped chute and tool shaft with inner gluing device or apparatus.
Figure 9:
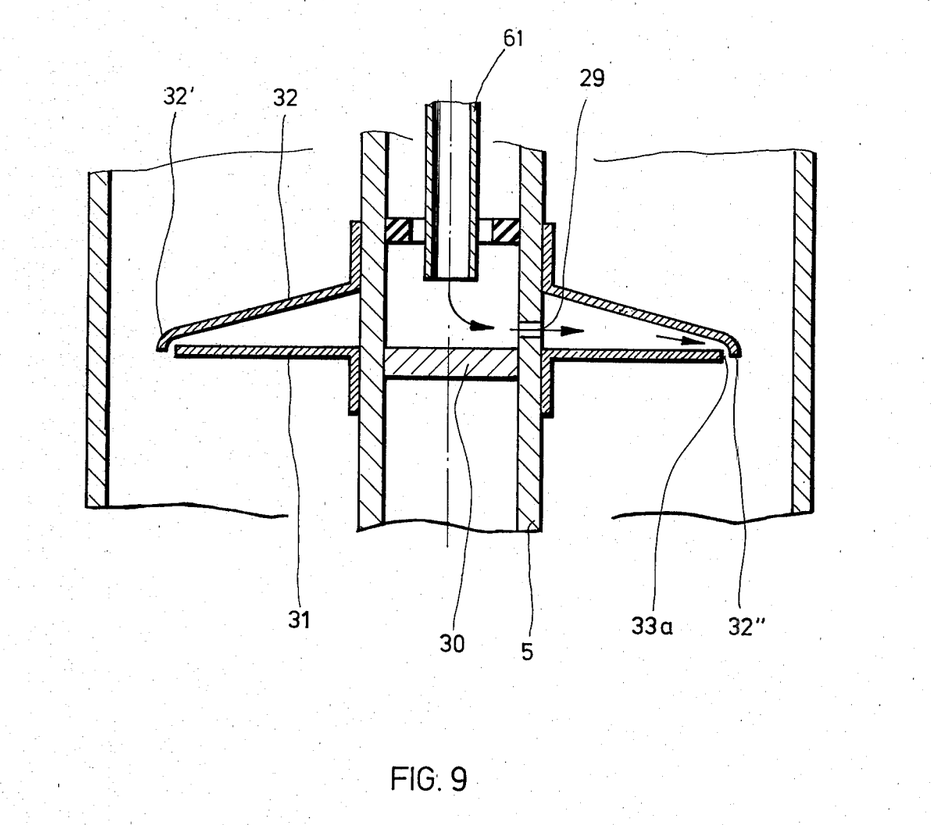
FIG. 9 shows a further possible embodiment of the centrifuging disc or plate upon the tool shaft effecting the glue distribution.

FIGS. 8 and 9 show an embodiment with which the glue is supplied from the inside. Within the hollow shaft 5 (FIG. 8) there is located a glue supply pipe or tube 61 from which the glue by way of several openings 29 provided in the shaft 5 comes upon a glue distributor plate or disc 31 which is provided with a preferably slanted outwardly inclined cover 32. This cover 32 forms a slot-shaped discharge opening 33a with the edge 33 of the plate or disc 31, and the glue is centrifuged outwardly in the direction of the wall of the container 1 by way of the discharge opening 33a where the chip flow is located along the wall. Below the discharge opening of the glue supply pipe or tube 28 there is located a part 30 covering the hollow chamber of the shaft 5, for example a disc, which is provided closely below the discharge opening 30. The actual discharge opening 33a is located approximately in a spacing of 20 mm to 100 mm from the inner wall; the glue passes through the discharge opening 33a distributed finely outwardly directly into the chip ring located therewith.

The embodiment according to FIG. 9 differs from the embodiment of FIG. 8 only thereby that at the radially outer end of the slanted or inclined cover 32 in the region of the edge 32' of this cover there is provided a draft or outline edge 32" formed thereto which limits the slot-shaped discharge opening 33a.

FIG. 4 shows an embodiment for the chip-ring-forming tools provided in the ring-forming zone 15 (see FIG. 1). These ring-forming tools are arranged on the shaft 5 offset or displaced relative to each other in peripheral direction, and bent away forwardly in such a manner in rotational direction 28 that the tools form an acute angle $\alpha$ with the radial fastening plane thereof. The tools provide a continuously decreasing cross section outwardly as far as to the tip 40 thereof extending accordingly substantially pointedly in the manner of a horn whereby the tool back 36 is rounded off. Under these circumstances, the face 37 of the chip-forming tool 9 directed forwardly in rotational direction 28 provides two straight surfaces 38, 39 lying substantially V-shaped relative to each other. The embodiment of a tool effects a soft, chip-protecting engagement first in the tip 40 of the tool into the chip flow or into the chip ring and a displacement of the chips along the straight surfaces 38, 39 whereby these chips are intensively thoroughly mixed with each other.

The brake tools 10 illustrated in FIGS. 11, 11a provide a scoop or blade-like extension 41 extending in rotational direction 28 of the shaft 5 of which the surface 42 directed upwardly is embodied slightly concave in curvature and the lower surface 43 thereof extends outwardly bulged or curved in arcuate shape in a direction onto the shaft 44 of the tool 10. A leading edge 45 of the brake tool 10 extends into a tip 46 in such a manner that this front tip 46 of the foremost point of the tool is in the rotating direction and the front edge 45 of the tip 46 extends back toward the extension or connection in the shaft. The rear edge 48 of the narrow surface of the blade or scoop is made in an arcuate shape and has a transition with a larger arcuate radius into the lower edge leading to the shaft in rotational direction and parallel to the outer edge 49.

Advantageously, the brake tool 10 is so installed slanted or inclined forwardly that the tip thereof is deeper than the rear blade surface, so that the chip material received or taken up receives a movement component directed upwardly in rotational direction. The slanted or inclined position can be adjusted respectively and correspondingly according to the quantity conveyed or passing therethrough and according to the chip characteristic.

Figure 12:
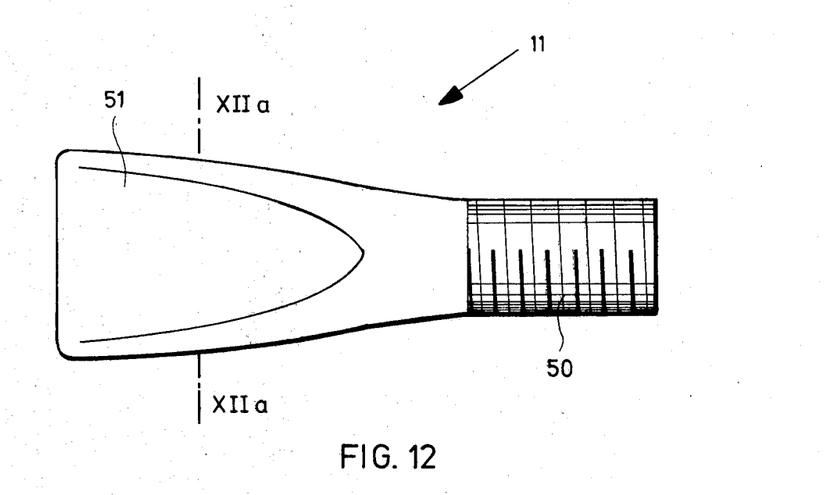
FIG. 12 is a view upon a conveying tool.
Figure 12A:
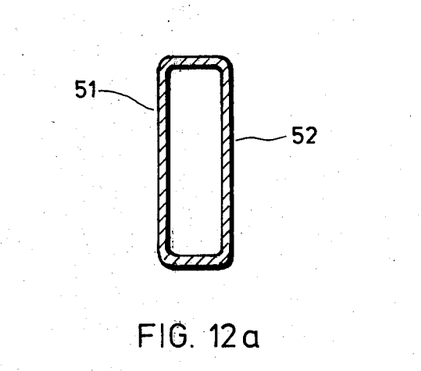
FIG. 12a is a section taken along line XIIa—XIIa of FIG. 12.

The discharge tools 11 illustrated schematically in FIGS. 12, 12a are made having a paddle shape and taper outwardly. The shaft 50 which is provided with the screw-in thread provides a circular cross section with the other tools and has a transition from this circular shape into a substantially rectangular or square cross section which is increasingly smaller toward the outside in such a manner that the chip material conveying face surface 51 is slightly concave while the rear surface 52 is substantially a straight or linear surface embodied therewith.

Aside from the previously indicated advantages, there is particularly advantageous with the apparatus according to the present invention that the drive capacity is up to over 50% smaller than with devices or apparatus according to the state of the art. Consequently, the present inventive apparatus provides a saving in energy.

In summary, the present invention provides a method for gluing or application of glue relative to chips or particles containing chips, fibers, and similar ligno-cellular material which are discharged falling freely into a vertical chute, and being subjected at least partially to rotational forces during a downward movement thereof, being glued and thereafter being discharged from the chute characterized thereby that the chips during the free fall thereof are collected into a rotating chip material ring and are glued after at least substantial formation of the chip material ring are subjected to upwardly directed components of movement in such a manner that the chip material ring is stopped in the downward movement thereof. The upwardly directed components of movement are so large that the downwardly moving chip particles of the formed or forming chip material ring are reversed in the direction of movement thereof and are again moved upwardly. The upwardly directed components of movement are generated continuously for example by at least one flowing medium such as a spray stream and/or discontinuously for example by rotating tools.

The gluing machine for carrying out the foregoing method includes at least a substantially vertical chute having a circular-shaped cross section, also including an upper chip inlet and a chip outlet located therebelow, means for supplying glue and also including rotating tools influencing the movement of the chips, characterized thereby that the drum-shaped chute 1 has a shaft 5 passing therethrough rotatable at high speed upon which above in the region of the incoming chips there are arranged chip-ring-forming tools 9 and therebelow there are arranged braking tools 10 stopping the downward movement of the chips, and that the chip inlet 2 provides a directional component 2', 2" parallel to the rotational axis 5' of the shaft 5 and the chip discharge or outlet 3 is arranged at the lower end of the chute 1. The brake tools 10 are arranged offset or displaced relative to each in axial and in rotational direction behind or after the chip-ring-forming tools 9 in the arrow direction A of the chips. At least one brake tool 10 is arranged before the longitudinal middle of the chute 1 in the arrow direction A. The brake tools 10 are located behind or after the gluing tools 13 in the arrow direction A of the chips. The inlet 2 is arranged above the upper face or side 18 of the chute 1 and the opening 2a thereof penetrates or passes through the face side 18 of the chute 1 (FIG. 1). The opening 3c of the chip discharge 3a (FIG. 2) lies within the lower chute face side 19. A rotating centrifugal disc 12 is arranged in the region of the discharge 3 in FIG. 1. The centrifugal disc 12 is embodied for formation of air guidance diverting or shunting the chips away. Pipes or tubes 13' are provided for the glue supply means 13 which are arranged in an axial and/or radial plane or helical or spiral shape distributed along the periphery or circumference of the chute 1.

A hose conduit 26 is provided as a distributor in the height or level of the glue supply tube 13' from which conduits 26a lead to the pipes or tubes 13' (FIG. 6). The glue supply tube 13' is provided with high pressure nozzles, preferably wide-spray or stream nozzles and are connected with a high pressure pump. The glue supply nozzles 27 are pivotally journalled in such a manner that the spray stream is pivotable within a pivot range of 10° to 90° toward all sides, preferably upwardly and downwardly. A glue supply tube 61 is provided in the hollow shaft 5 of FIG. 8 and several discharge openings 29 are provided in the shaft 5 arranged or associated as to the opening of this glue supply tube 61. The ring-forming tools 9 offset or displaced as to each other in axial or peripheral direction are bent forwardly in rotational direction 28 in such a manner that the tools 9 form an acute angle with the radial as well as having a continuously decreasing cross section outwardly as far as to the tip and furthermore that the tool back portion is rounded off according to the FIGS. 10, 10a.

The brake tool 10 has a scoop or blade-type extension extending in the rotational direction 28 of the shaft 50 with the upwardly directed surface 42 of the extension being curved slightly concave and the lower surface 43 thereof extending in an arcuate shape in the direction toward the tool shaft 44 according to FIGS. 11, 11a.

The brake tool 10 is slanted or inclined rearwardly as arranged relative to a radial plane extending through the tool shaft and furthermore the inclined position of the brake tool 10 is adjustable.

The feeding or advancing tools 11 are provided with radially outwardly tapered paddel-shaped working surfaces according to FIGS. 12, 12a.

The tool shaft 5 and the tools 9, 10, 11 arranged thereon are provided with cooling passages for conveying cooling water therethrough.

The present invention is, of course, in no way restricted to the specific disclosure of the specification and drawings, but also encompasses any modifications within the scope of the appended claims.

What we claim is:

1. A gluing machine for application of glue on chips, fibers and similar ligno-cellulose-containing particles which are discharged falling free into an at least substantially vertical chute having a circular shaped cross section, as well as having an upper chip inlet and a chip outlet located therebelow and also including means for supply of glue and having rotating tools influencing the movement of the chips, comprising a drum-shaped chute means, a shaft rotating at relatively high speed passing through said chute means, outwardly projecting tool means on said shaft for imparting centrifugal forces on the free falling chip material exiting the upper inlet to form a rotating chip material ring that accumulates or deposits on the inner wall of the vertical chute and moves downwardly in a helical or spiral manner, brake tools also arranged on said shaft for transmitting upwardly directed components of movement instrumental in stopping the downward free-falling movement of the chips, the chip inlet providing a directional component parallel to the rotational axis of the shaft and the chip outlet being arranged at a lower end of the chute means, and means for feeding glue after the at least substantial formation of the chip material ring and prior to subjecting the chips to the brake tools.

2. A gluing machine for application of glue on chips, fibers and similar ligno-cellulose-containing particles which are discharged falling free into an at least substantially vertical chute having a circular shaped cross section, as well as having an upper chip inlet and a chip outlet located therebelow and also including means for supply of glue and having rotating tools influencing the movement of the chips, comprising a drum-shaped chute means, a shaft rotating at relatively high speed passing through said chute means, tool means on said shaft for imparting centrifugal forces on the free falling chip material exiting the upper inlet to form a rotating chip material ring that accumulates or deposits on the inner wall of the vertical chute and moves downwardly in a helical or spiral manner, and brake tools also arranged on said shaft for stopping the downward free-falling movement of the chips, the chip inlet providing a directional component parallel to the rotational axis of the shaft and the chip outlet being arranged at a lower end of the chute means, said tool means for ring formation and tools displaced relative to each other in axial and peripheral direction being bent forwardly in direction of rotation in such a manner that an acute angle is formed thereby as to radial direction and a tip decreasing continuously in crosss section to the outer end thereof is provided along with a tool back portion which is rounded off.

3. A gluing machine for application of glue on chips, fibers and similar ligno-cellulose-containing particles which are discharged falling free into an at least substantially vertical chute having a circular shaped cross section, as well as having an upper chip inlet and a chip outlet located therebelow and also including means for supply of glue and having rotating tools influencing the movement of the chips, comprising a drum-shaped chute means, a shaft rotating at relatively high speed passing through said chute means, tool means on said shaft for imparting centrifugal forces on the free falling chip material exiting the upper inlet to form a rotating chip material ring that accumulates or deposits on the inner wall of the vertical chute and moves downwardly in a helical or spiral manner, brake tools also arranged on said shaft for stopping the downward free-falling movement of the chips, the chip inlet providing a directional component parallel to the rotational axis of the shaft and the chip outlet being arranged at a lower end of the chute means, and a blade-like extension being provided for said brake tool and extending in the rotational direction of said shaft, said extension having an upper surface with slightly concave curvature and an under suface extending in an arcuate shape in a direction toward said shaft on which said tools and tool means are mounted.

4. A gluing machine for application of glue on chips, fibers and similar ligno-cellulose-containing particles which are discharged falling free into an at least substantially vertical chute having a circular shaped cross section, as well as having an upper chip inlet and a chip outlet located therebelow and also including means for supply of glue and having rotating tools influencing the movement of the chips, comprising a drum-shaped chute means, a shaft rotating at relatively high speed passing through said chute means, tool means on said shaft for imparting centrifugal forces on the free falling chip material exiting the upper inlet to form a rotatinng chip material ring that accumulates or deposits on th inner wall of the vertical chute and moves downwardly in a helical or spiral manner, brake tools also arranged on said shaft for stopping the downward free-falling movement of the chips, the chip inlet providing a directional component parallel to the rotational axis of the shaft and the chip outlet being arranged at a lower end of the chute means, said brake tools being inclined rearwardly as to a radial plane extending through said shaft upon which the tools are mounted and means for adjusting the inclined position of said brake tool.

5. A gluing machine for application of glue on chips, fibers and similar ligno-cellulose-containing particles which are discharged falling free into an at least substantially vertical chute having a circular shaped cross section, as well as having an upper chip inlet and a chip outlet located therebelow and also including means for supply of glue and having rotating tools influencing the movement of the chips, comprising a drum-shaped chute means, a shaft rotating at relatively high speed passing through said chute means, tool means on said shaft for imparting centrifugal forces on the free falling chip material exiting the upper inlet to form a rotating chip material ring that accumulates or deposits on the inner wall of the vertical chute and moves downwardly in a helical or spiral manner, and brake tools also arraanged on said shaft for stopping the downward free-falling movement of the chips, the chip inlet providing a directional component parallel to the rotational axis of the shaft and the chip outlet being arranged at a lower end of the chute means, and conveying tool members being provided having paddle-shaped working surfaces tapered radially outwardly thereof.

6. A gluing machine according to claim 5, wherein said tool means forming the chip ring are arranged behind said brake tools in accordance with the direction of movement of the chips, said tool means and said brake tools also being arranged offset relative to each other in axial and circulating direction.

7. A gluing machine according to claim 5, in which said chute means has a longitudinal middle portion and at least one brake tool is arranged before the longitudinal middle portion of said chute means.

8. A gluing machine according to claim 5, in which gluing tool members are provided located behind the brake tools in the direction of movement of the chips.

9. A gluing machine according to claim 5, with which said chute means has an upper face side arranged above the inlet and an opening passing through the face side of said chute means.

10. A gluing machine according to claim 5, in which said chute means includes a lower face side and an opening for chip discharge is located within the lower face side of said chute means.

11. A gluing machine according to claim 5, in which a centrifugal disc is rotatably arranged in the region of the outlet.

12. A gluing machine according to claim 11, wherein said centrifuging disc is provided with air-guidance means shunting off the chips.

13. A gluing machine according to claim 5, including pipes for supplying glue distributed over the periphery of the chute means.

14. A gluing machine according to claim 13, in which said tubes for supplying glue are arranged axially along the periphery of the chute means.

15. A gluing machine according to claim 13, in which said tubes are arranged radially as distributed over the periphery of said chute means.

16. A gluing machine according to claim 13, in which said tubes are arranged distributed helically over the periphery of said chute means.

17. A gluing machine according to claim 13, wherein a hose conduit is provided as a distributor on the level of said tubes for supplying glue and additional conduits lead to said tubes.

18. A gluing machine according to claim 17, having high pressure nozzles and also a high pressure pump connected therewith for supplying glue to said tubes.

19. A gluing machine according to claim 18, wherein said high pressure nozzles are wide stream nozzles.

20. A gluing maching according to claim 5, in which nozzles for supplying glue are pivotally journalled for directing a spray stream thereof toward all sides.

21. A gluing machine according to claim 20, in which the pivotally journalled nozzles for supplying glue have a pivot range from 10° to 90° in all directions.

22. A gluing machine according to claim 21, in which said nozzles are pivotable upwardly and downwardly.

23. A gluing machine according to claim 5, in which said shaft is hollow and a tube for supplying glue is provided therein and said shaft has several discharge openings associated with the opening of said tube for supplying glue located in the hollow shaft.

24. A gluing machine acording to claim 5, in which said tools, tool means and tool members as well as said shaft for mounting thereof are provided with means forming cooling passages for conveying cooling medium therethrough.

* * * * *